(12) United States Patent
Bouaziz et al.

(10) Patent No.: US 10,766,419 B2
(45) Date of Patent: Sep. 8, 2020

(54) FASTENING CONSTRUCTION, IN PARTICULAR FOR AN EXTERIOR VISION UNIT OF A MOTOR VEHICLE

(71) Applicant: MCI (Mirror Controls International) NETHERLANDS B.V., Woerden (NL)

(72) Inventors: François Bouaziz, Woerden (NL); Peter Alexander Hamming, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 79 days.

(21) Appl. No.: 15/780,516

(22) PCT Filed: Dec. 1, 2016

(86) PCT No.: PCT/NL2016/050841
§ 371 (c)(1),
(2) Date: May 31, 2018

(87) PCT Pub. No.: WO2017/095224
PCT Pub. Date: Jun. 8, 2017

(65) Prior Publication Data
US 2018/0345863 A1    Dec. 6, 2018

(30) Foreign Application Priority Data

Dec. 2, 2015  (NL) .................................. 2015897

(51) Int. Cl.
*B60R 1/076*   (2006.01)
*G02B 7/182*   (2006.01)
(52) U.S. Cl.
CPC .............. *B60R 1/076* (2013.01); *G02B 7/182* (2013.01)

(58) Field of Classification Search
CPC ...... G02B 7/182; G02B 7/198; B60R 1/0617; B60R 1/076
USPC ................. 359/841, 872, 877, 900
See application file for complete search history.

(56) References Cited

U.S. PATENT DOCUMENTS

| | | | | | |
|---|---|---|---|---|---|
| 4,789,232 | A * | 12/1988 | Urbanek | ............... | B60R 1/076 248/475.1 |
| 4,982,926 | A * | 1/1991 | Mori | .................. | B60R 1/074 192/209 |
| 6,022,113 | A * | 2/2000 | Stolpe | ................. | B60R 1/074 248/479 |
| 6,130,514 | A * | 10/2000 | Oesterholt | ............ | B60R 1/074 248/479 |
| 6,322,221 | B1* | 11/2001 | van de Loo | ........... | B60R 1/074 359/841 |
| 7,137,715 | B2* | 11/2006 | Schuurmans | ........... | B60R 1/06 359/841 |
| 7,374,299 | B2* | 5/2008 | Brouwer | .............. | B60R 1/074 359/841 |

(Continued)

FOREIGN PATENT DOCUMENTS

NL     1019258 C2    5/2003
WO   03/037680 A1   5/2003

*Primary Examiner* — Ricky D Shafer
(74) *Attorney, Agent, or Firm* — Volpe Koenig (57) ABSTRACT

Fastening construction (1), in particular for an exterior vision unit of a motor vehicle, comprising a base part (3) which can be fixedly connected with a vehicle, and a rotation part (4) which is couplable with the base part (3) and which in coupled condition forms a central shaft (5) for pivotally bearing-mounting a housing of an exterior vision unit.

21 Claims, 12 Drawing Sheets

(56) References Cited

U.S. PATENT DOCUMENTS

| | | | |
|---|---|---|---|
| 7,490,945 B2* | 2/2009 | Proctor | B60R 1/074 |
| | | | 248/478 |
| 7,543,949 B2* | 6/2009 | van den Brink | B60R 1/074 |
| | | | 248/479 |
| 7,547,855 B2* | 6/2009 | Brouwer | B60R 1/074 |
| | | | 200/405 |
| 8,313,202 B2* | 11/2012 | van Stiphout | B60R 1/0617 |
| | | | 359/872 |
| 2004/0113038 A1 | 6/2004 | Schuurmans | |
| 2005/0103971 A1 | 5/2005 | Van Stiphout | |
| 2007/0035862 A1* | 2/2007 | Brouwer | B60R 1/074 |
| | | | 359/841 |
| 2013/0321941 A1* | 12/2013 | van Stiphout | B60R 1/074 |
| | | | 359/877 |

* cited by examiner

FASTENING CONSTRUCTION, IN PARTICULAR FOR AN EXTERIOR VISION UNIT OF A MOTOR VEHICLE

CROSS REFERENCE TO RELATED APPLICATION

This application is a 35 USC § 371 National Stage application of International Patent Application No. PCT/NL2016/050841, which was filed Dec. 1, 2016, entitled "Fastening Construction, in Particular for an Exterior Vision Unit of a Motor Vehicle" and Netherlands Patent Application No. 2015897, which was filed Dec. 2, 2015, and are incorporated herein by reference as if fully set forth.

The invention relates to a fastening construction, in particular for an exterior vision unit of a motor vehicle, comprising a base part which can be fixedly connected with a vehicle, and a rotation part which is couplable with the base part and which in coupled condition forms a central shaft for pivotally bearing-mounting a housing of an exterior vision unit.

Such a fastening construction is known from NL 1019258 and is used for fastening an exterior vision unit, such as a housing provided with a frame, which includes an exterior mirror, camera and/or display, to a motor vehicle, in particular to the outside thereof.

It is customary to design exterior vision units of motor vehicles in such a manner that they can pivot towards the vehicle, for instance in case of a calamity, such as a collision, or to occupy less space in parked condition. The exterior vision units are then designed with a central shaft, which is fixedly connected with the vehicle and around which the housing of the exterior vision unit with the frame, exterior mirror and other provisions can rotate when a particular moment is exceeded.

Because exterior vision units are mostly assembled separately and are mounted to the car as an assembly, the central shaft is often designed as a rotation part which can be coupled to a fixed part of the car, the base part.

This coupling can be carried out by connecting the rotation part with the base part using screws. The rotation part is then provided, for instance, with one or more holes which correspond with threaded holes in the base part. This solution has as an advantage that an operationally reliable connection can be made, but as a disadvantage that a large number of additional assembly operations are required, and that, moreover, per threaded hole an additional part is required: the screw.

It has been found that fitting the screws can lead to errors. In particular, it may be forgotten to fit screws and/or loose screws may remain behind in the exterior vision unit. In addition, the tightening force of screws is difficult to control. Also, the screws require additional mounting space, which may seriously hamper the freedom in the design of the exterior vision unit.

In NL 1019258 it is has been proposed to provide the base part and the rotation part with at least one cam and groove pair cooperating as a bayonet catch, such that in a first angular position of the rotation part with respect to the base part the rotation part for the purpose of coupling can be displaced along a geometric axis to the base part to align the cam and groove pair for cooperation and that, when the cam and groove pair has been aligned for cooperation, the rotation part is pivotable about the geometric axis from the first angular position to a second angular position. In the second angular position, by cooperation of the cam and groove pair, the rotation part is locked with respect to the base axially along the geometric axis. Due to the rotation part and the base part being furthermore provided with cooperating blocking means, in the second angular position the rotation part is locked against rotation relative to the base part about the geometric axis.

While this construction offers many advantages, it has been found difficult in practice to realize the axial lock in an operationally reliable manner free from play. In particular, it is relatively costly to manufacture the cam and groove pairs with low axial play and, also, axial play can increase in the course of the construction's life due to external factors such as vibrations and temperature fluctuations.

The invention contemplates an improved fastening construction. In particular, the invention contemplates a fastening construction with cam and groove pair cooperating as bayonet catch, with which, whilst preserving the advantages mentioned, the disadvantages mentioned can be counteracted.

To that end, the invention provides a fastening construction, in particular for an exterior vision unit of a motor vehicle, comprising a base part which can be fixedly connected with a vehicle, and a rotation part which is couplable with the base part and which in coupled condition forms a central shaft for pivotally bearing-mounting a housing of an exterior vision unit, wherein the base part and the rotation part are provided with at least one cam and groove pair cooperating as a bayonet catch, such that in a first angular position of the rotation part with respect to the base part, the rotation part for the purpose of coupling can be displaced along a geometric axis to the base part to align the cam and groove pair for cooperation and wherein the rotation part is pivotable around the geometric axis from the first angular position to a second angular position in which by cooperation of the cam and groove pair the rotation part is locked with respect to the base part axially along the geometric axis, wherein the cam and groove pair is provided with surfaces cooperating under wedging action, and wherein the rotation part furthermore cooperates with a tightening part in a manner rotation-coupled via a breakable coupling, so that the tightening part, with the breakable coupling breaking, can rotate relative to the base part and a remaining portion of the rotation part from the second angular position about the geometric axis to a third angular position.

By providing the bayonet catch with a cam and groove pair cooperating under wedging action, it is made possible, through the wedging effect upon rotation to the second position, to eliminate the axial play from the bayonet catch, and even to apply an axial bias. By further providing a breakable coupling between tightening part and rotation part, it can be ensured at the same time that, even at a relatively ample axial tolerance between cam and groove pair, during tightening a predetermined maximum tightening moment on the bayonet catch is not exceeded. Thus, with the present fastening construction an axially low-play or even no-play lock-up can be realized cost-effectively and reliably.

When the rotation part furthermore cooperates via a fixation coupling with the tightening part, which fixation coupling couples the tightening part in the third angular position nonrotatably with the rotation part, it can be achieved that after uncoupling of the breakable coupling, and rotation of the tightening part relative to the remaining portion of the rotation part, the tightening part can be coupled with the remaining portion of the rotation part again to form a whole.

When the rotation part and the base part are provided with cooperating blocking parts which block the rotation part in the third angular position from rotation about the geometric axis relative to the base part, it can be achieved that the rotation part and the base part can be locked against rotation relative to each other. As a result, during use a moment can be exerted on the rotation part without the wedging action of the bayonet catch being influenced. In particular, this can prevent the bayonet catch being overloaded, or coming loose unintendedly.

When the housing of the exterior vision unit during connection cooperates with the tightening part in a moment-transmissive manner, in particular via a ring with engaging elements that is arranged on the tightening part, the exterior vision unit can be secured by rotating the housing.

When the tightening part is movable relative to the rotation part axially along the geometric axis, the break coupling, the fixation coupling and the cooperating blocking parts can be realized in a structurally simple manner.

When the tightening part during use is biased under spring action, in particular towards a bearing part extending substantially radially with respect to the geometric axis and carrying a cam or groove of the bayonet catch, this allows the break coupling, the fixation coupling and the cooperating blocking parts to be energized in a structurally simple manner. For the purpose of generating spring action, it is then preferred to provide a spring, in particular a helical spring, arranged around the central shaft.

Further embodiments of the fastening construction are represented in the claims.

The invention also relates to an exterior vision unit for a motor vehicle, comprising a fastening construction.

The invention furthermore concerns a method for fastening an exterior vision unit to a motor vehicle, wherein a rotation part of an exterior vision unit around which a housing is pivotally bearing-mounted is connected via a bayonet catch with a base part which is mounted to the motor vehicle, comprising a first assembly step in which the rotation part is displaced along a geometric axis to the base part to align at least one cam and groove pair of the bayonet catch for cooperation, and wherein in a second assembly step the rotation part, by exertion of a tightening moment on an engaging part, is pivoted about the geometric axis from a first angular position to a second angular position in which, by wedging action of the at least one cam and groove pair, the rotation part is locked with respect to the base part axially free from play along the geometric axis, and wherein in a third assembly step, the tightening part, as a result of the wedging action between cam and groove pair, with a breakable coupling between tightening part and a remaining portion of the rotation part breaking, rotates from the second angular position relative to the base part and the remaining portion of the rotation part to a third angular position.

The tightening part can then in the third angular position be nonrotatably coupled with the rotation part via a fixation coupling.

Further, the rotation part in the third angular position may be blocked via cooperating blocking parts from rotation about the geometric axis relative to the base part.

Also, the housing of the exterior vision unit may during connection cooperate moment-transmissively with the tightening part.

Regarding the disclosure in this application it is noted that the technical features of the fastening construction described in the independent claim can also be regarded as an invention independently or in combination with only one or more technical features from the main claim, the subclaims or the description. Also, the method steps of the method described in the independent method claim can be regarded as an invention independently or in combination with only one or more method steps from the main claim, the subclaims or the description.

The invention will be further elucidated on the basis of an exemplary embodiment of a fastening construction which is shown in drawings. In the drawings:

FIGS. 4.1 through 4.6 each show a schematic perspective view of the fastening construction of FIG. 3 in successive stages during connection; and FIGS. 5.1 through 5.6 each show a simplified side view corresponding in detail to what is shown in FIG. 4.1 through FIG. 4.6.

In the figures, the same or corresponding parts are designated by the same reference numerals. It is noted that the figures are merely shown by way of exemplary embodiment and should not be regarded as limiting in any way.

Figure 1:
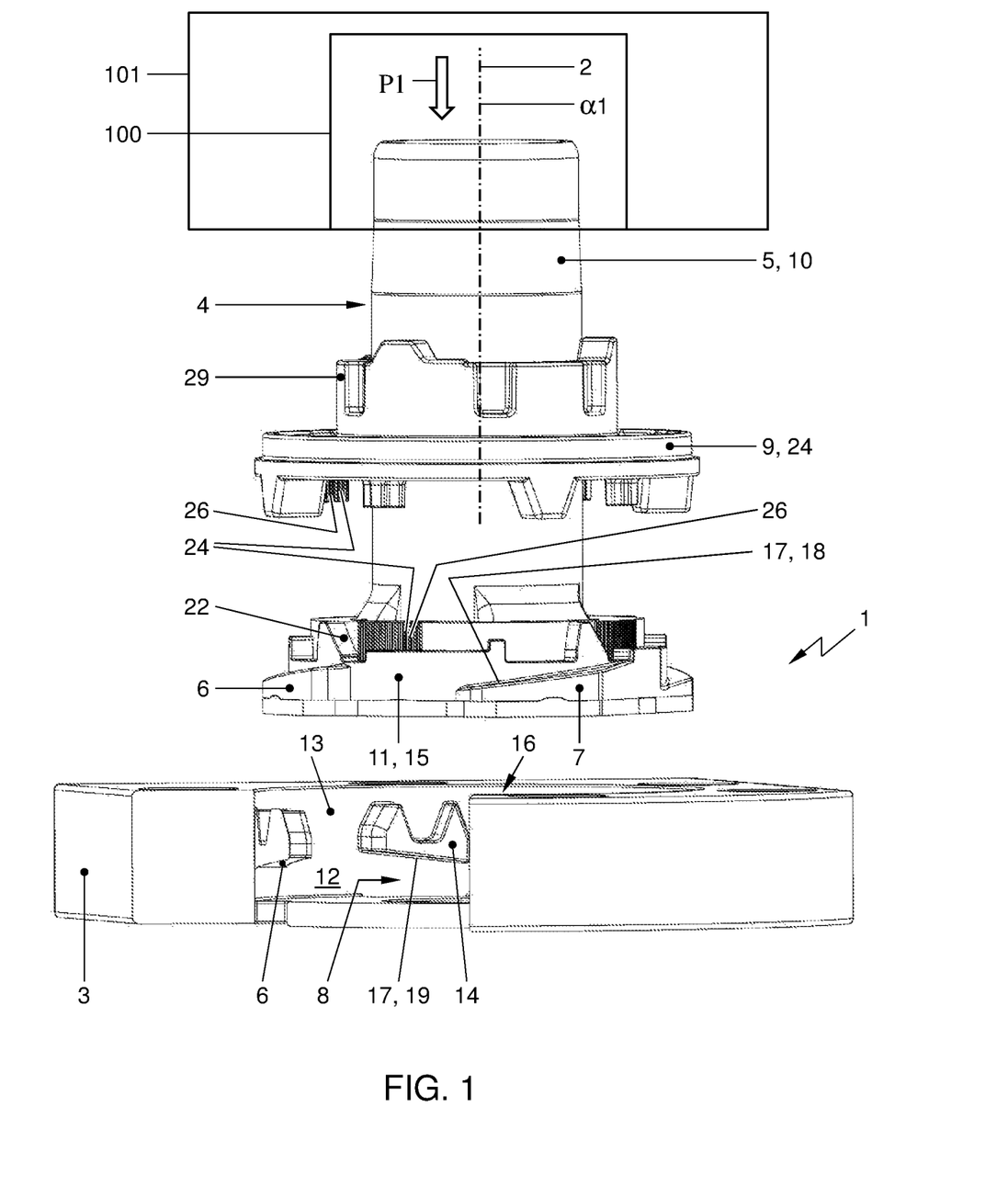
FIG. 1 shows a schematic perspective view of a first embodiment of a fastening construction according to the invention.

FIG. 1 shows a fastening construction 1, in particular for an exterior vision unit of a motor vehicle. The construction and operation of an exterior vision unit is known to those skilled in the art, and will not be further elucidated here. For details regarding the construction and operation of an exterior vision unit, reference is made to NL1019258 in which an exterior vision unit is described, and the contents of which may be considered inserted herein by reference.

The fastening construction 1 comprises a base part 3 which can be fixedly connected with a vehicle, and a rotation part 4 which is couplable with the base part 3. The rotation part 4 in coupled condition forms a central shaft 5 for pivotally bearing-mounting a housing 100 of an exterior vision unit 101. The base part 3 and the rotation part 4 are provided with at least one cam and groove pair 7,8 cooperating as a bayonet catch 6.

The rotation part 4 is provided with a main shaft part 10 extending along the geometric axis 2 and a bearing part 11 extending substantially radially with respect to the geometric axis 2 for bearing in a chamber 12 in the base part 3. In this exemplary embodiment, the bearing part 11 together with the chamber 12 embodies the bayonet catch 6. The cam 7 in this example is arranged as a radially and axially protruding ridge on the bearing part 11, and the groove 8 is formed under a projection 14 on the wall 13 of the chamber 12, between the lower edge of the projection 14 and the bottom of the chamber 12. The bearing part 11 is designed as a bearing plate 15 which is provided with radially outwardly and axially upwardly extending cams 7. The bearing plate 15 fits into the chamber 12 in the base part 3, which chamber 12 is provided with an access opening 16 corresponding to the bearing plate 15.

As shown in FIGS. 4.1 and 5.1, in a first angular position α1 of the rotation part 4 relative to the base part 3 the rotation part 4, for the purpose of coupling, can be displaced in the direction of the arrow P1 along a geometric axis 2 to the base part 3 to align the cam and groove pair 7,8 for cooperation. When the cam and groove pair 7,8 as shown in FIGS. 4.2 and 5.2, are aligned for cooperation, the rotation part 4 is pivotable about the geometric axis 2 in the direction of arrow P2 from the first angular position α1 to a second angular position α2. The second angular position α2 is shown in FIGS. 4.3 and 5.3.

The cam and groove pair 7,8 is provided with surfaces 17 cooperating under wedging action. The surfaces 17 of cam and groove pair 7,8 cooperating under wedging action are here implemented as mutually facing, lying wedge surfaces 18, 19 on, respectively, the upper side of the cam 7 formed by the ridge on the bearing part 11, and the lower edge of the groove 8 formed by the projection 14 on the wall 13 of the chamber 12.

The rotation part 4 cooperates with a tightening part 24 in a manner rotation-coupled via a breakable coupling 20. The tightening part 24 in this example comprises a flange 9 extending around a main shaft part 10 of the rotation part 4 and implemented as a separate component. With respect to the rotation part 4, the tightening part 24 is axially movable along the geometric axis 2. During use, the tightening part 24 is biased under spring action towards the bearing part 11. For generating spring action, there is provided a helical spring 30 (not shown in FIG. 1) arranged around the central shaft 5, which is restrained by the central shaft 5 and which presses on the tightening part 24. When, for the purpose of coupling, the rotation part 4, as shown in FIGS. 4.1 and 5.1, is moved in the direction of the arrow P1 along a geometric axis 2 towards the base part 3 to align the cam and groove pair 7,8 for cooperation, the tightening part 24 is restrained by the base part 3, while the main shaft part 10 and the flange 9 move on axially. The spring 30 is thereby compressed, and, when the cam and groove pair 7,8 as shown in FIGS. 4.2 and 5.2 are aligned for cooperation, the tightening part is under a strong spring action.

Figure 42:
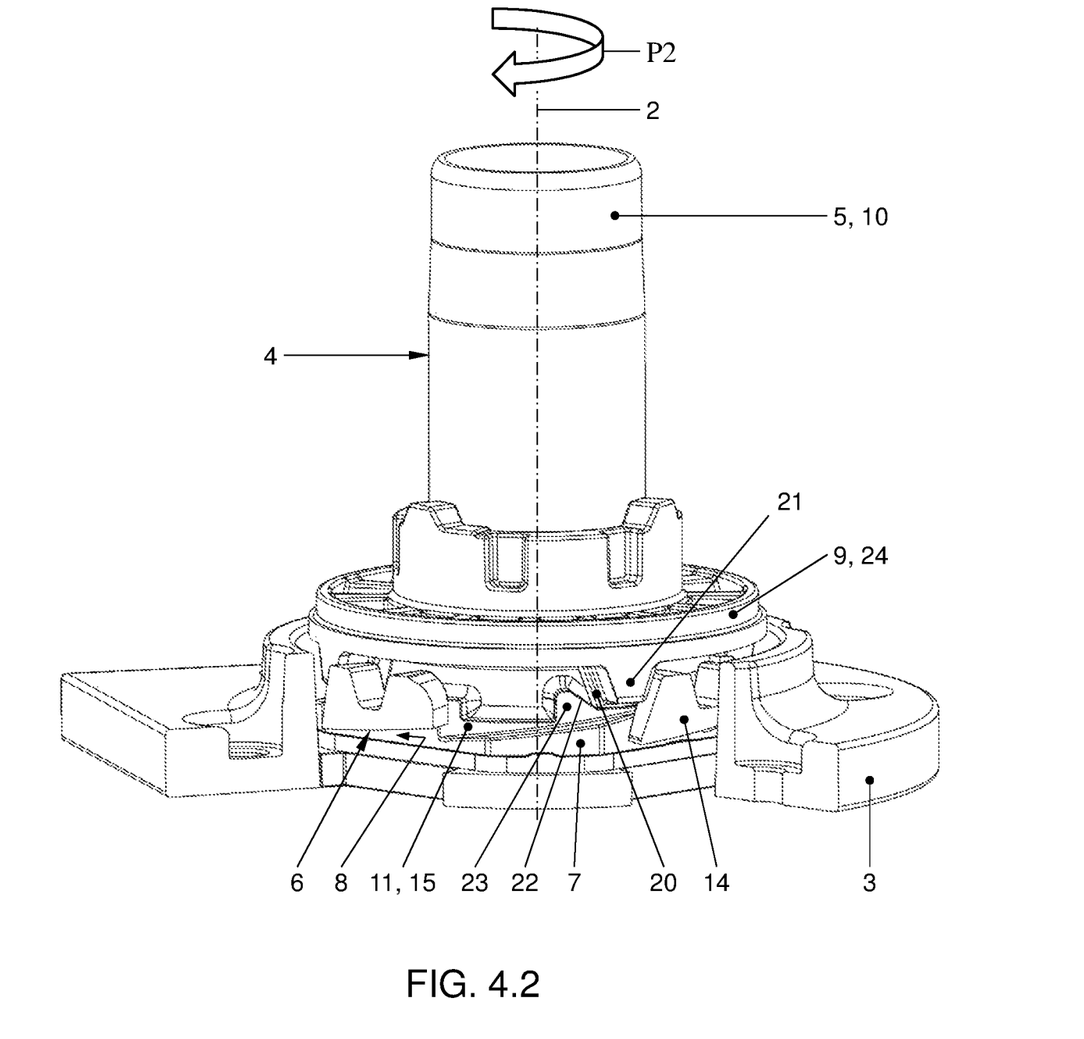
Figure 43:
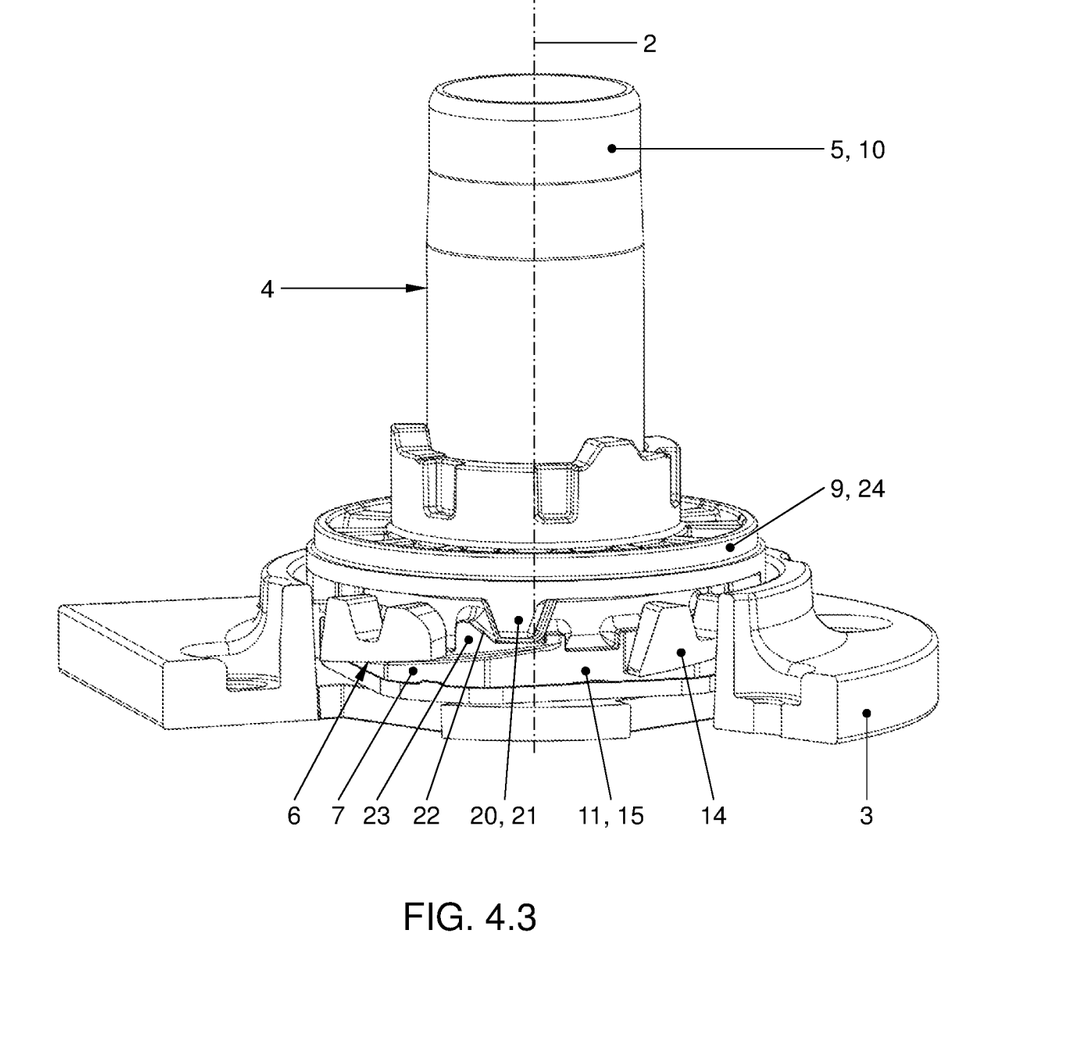
Figure 44:
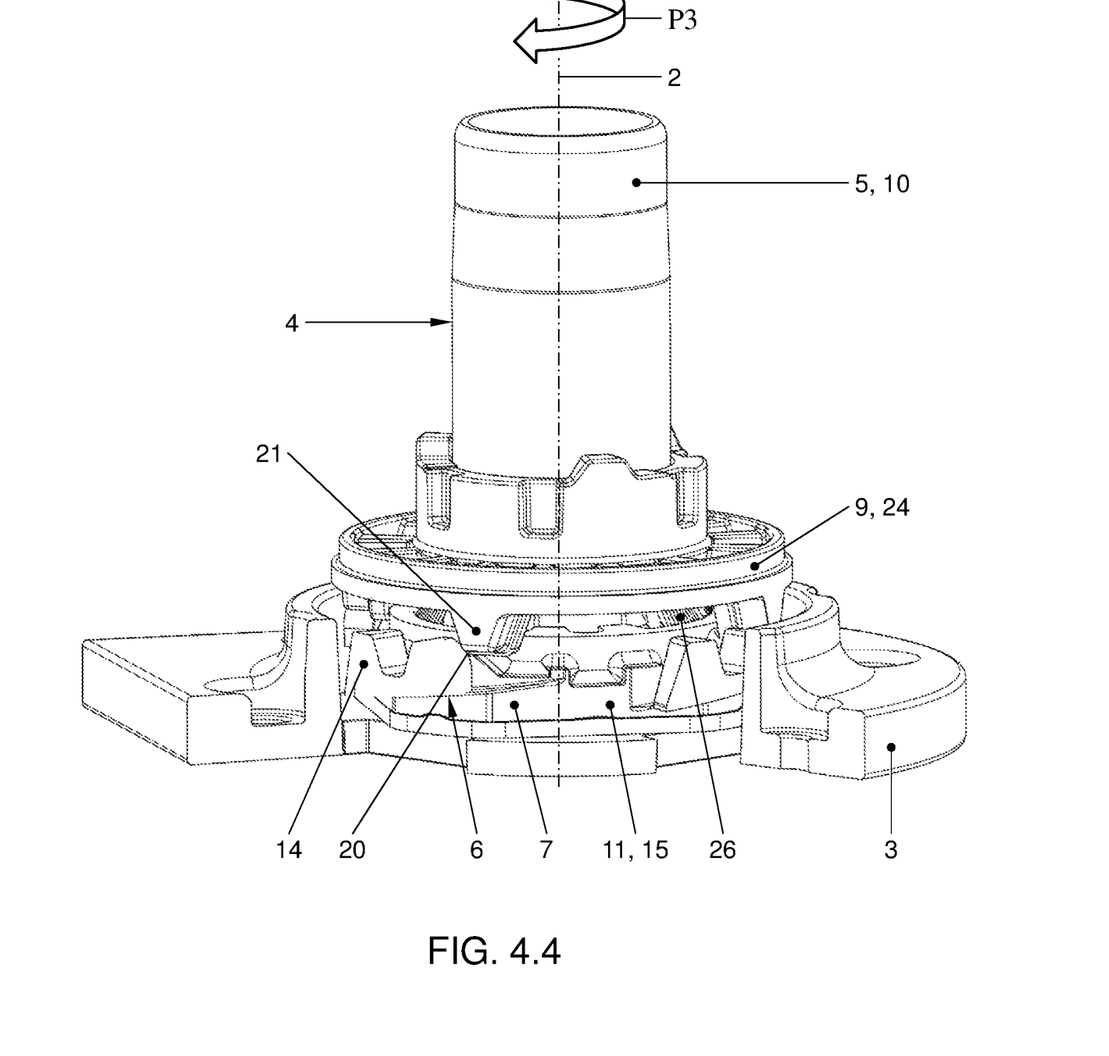
Figure 45:
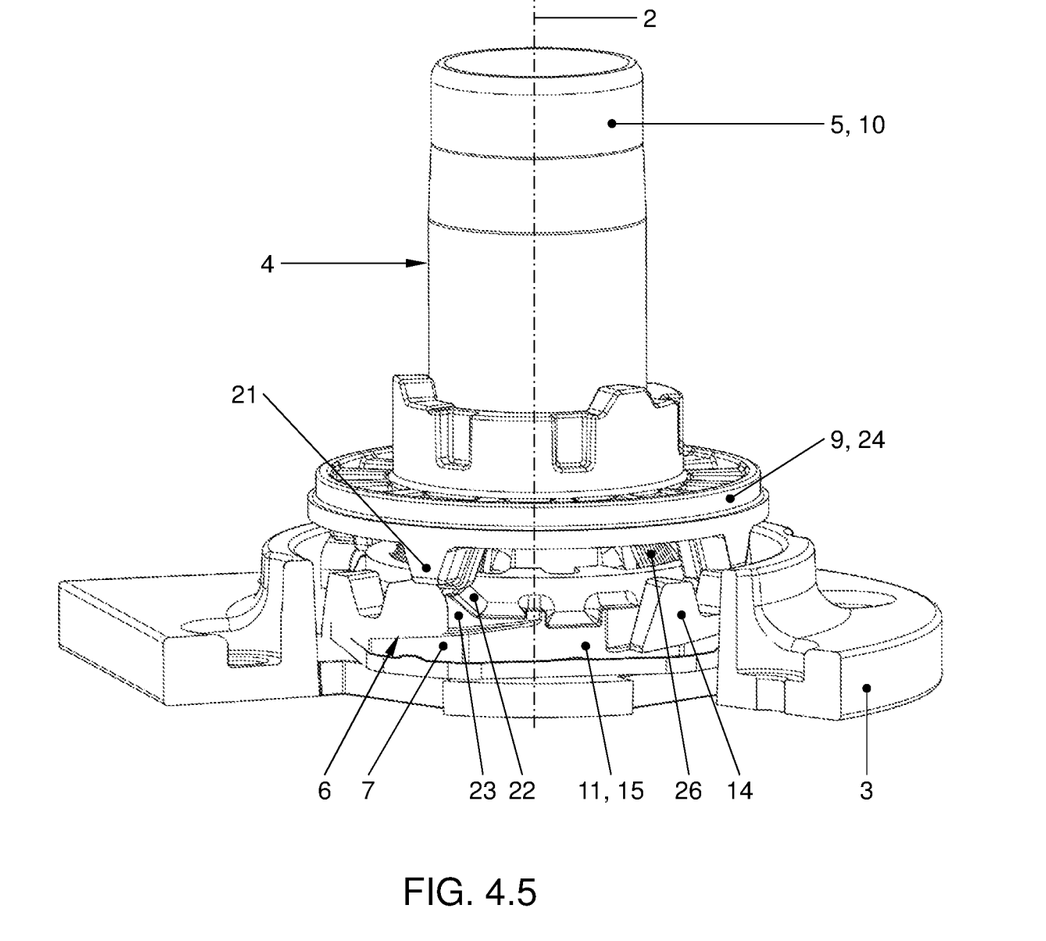
Figure 52:
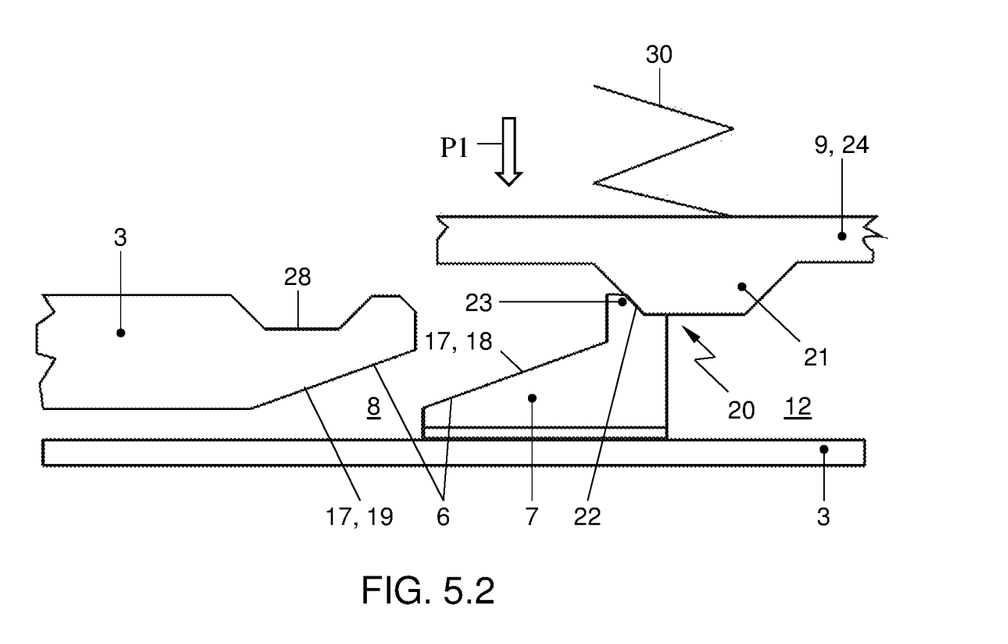
Figure 53:
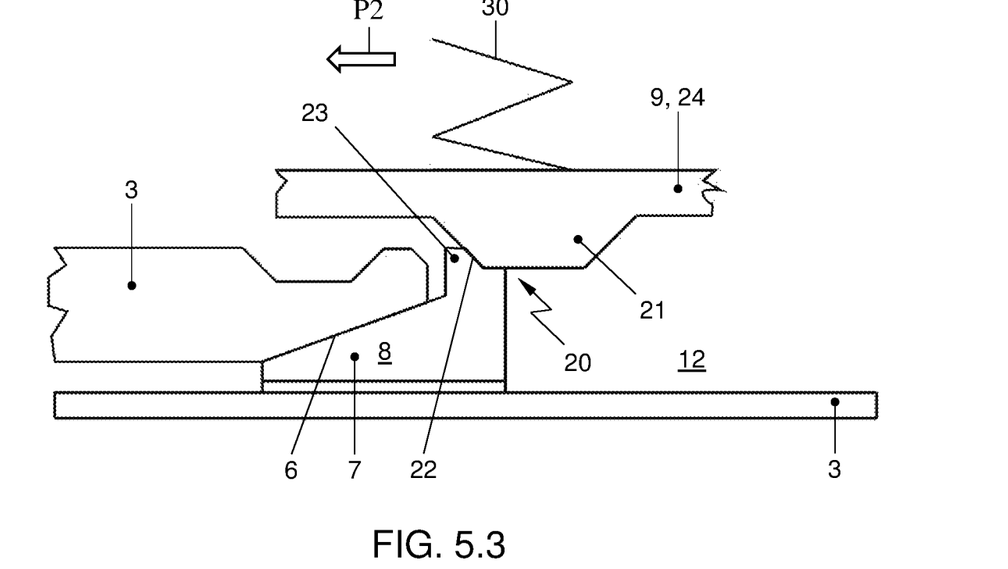
Figure 54:
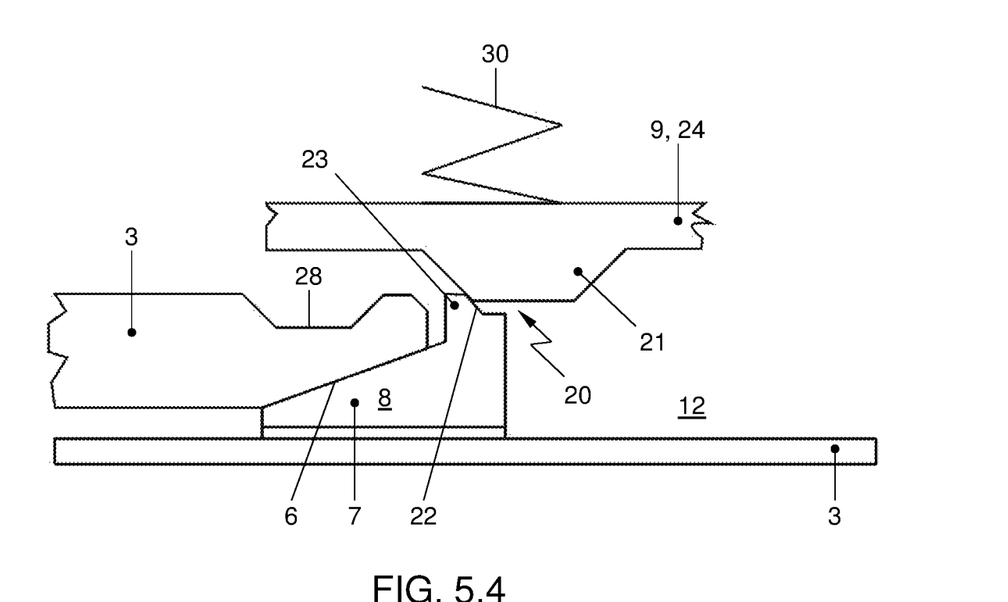
Figure 55:
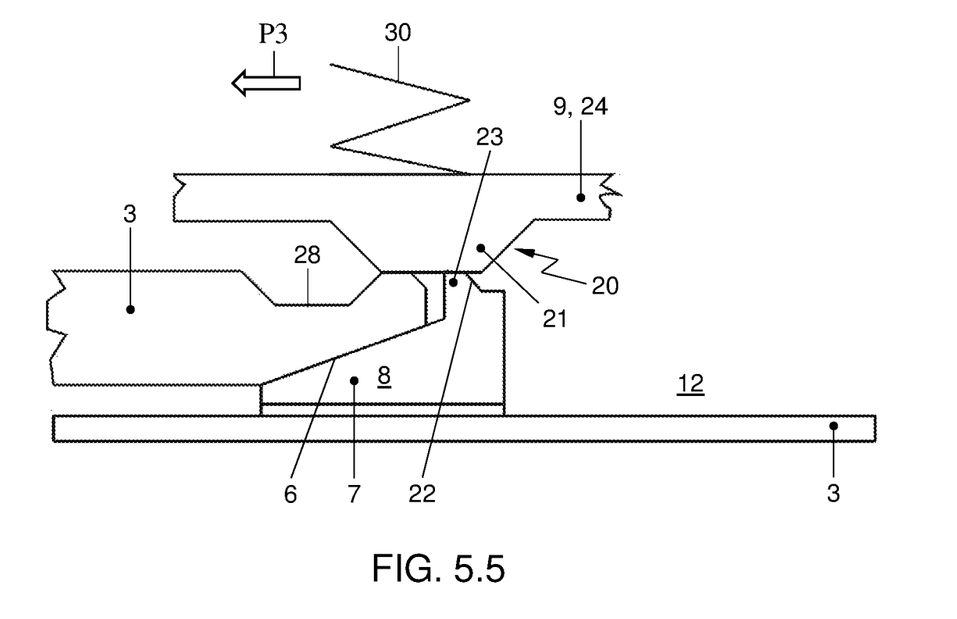

The breakable coupling 20 in this example comprises a coupling cam 21 provided on the tightening part 24, which coupling cam 21 during use cooperates under spring action with a run-on surface 22 arranged on the base part 3. The run-on surface 22 is here executed as an oblique side of a run-on cam 23 arranged on the bearing plate 15. As long as the surfaces 17 of cam and groove pair 7,8 do not cooperate yet, the coupling cam 21 of the tightening part 24 as shown in FIGS. 4.2 and 5.2 carries along the base part 3 under the influence of the spring action via run-on cam 23.

With the aid of the breakable coupling 20, the tightening part 24, with the breakable coupling 20 breaking, can rotate relative to the base part 3 and a remaining portion of the rotation part 4 from the second angular position α2 about the geometric axis 2 to a third angular position α3. When surfaces 17 of cam and groove pair 7,8 cooperate under wedging action as shown in FIGS. 4.3 and 5.3, further rotation of the rotation part 4 is hindered. As shown in FIGS. 4.4 and 5.4, as a result, the coupling cam 21 of the tightening part 24, against spring action, runs on, up against the oblique surface of run-on cam 23, and the coupling cam 21 can pass the run-on cam 23. As a result, the breakable coupling 20 breaks and the tightening part 24 as indicated with arrow P3 can rotate further with respect to the remaining portion of the rotation part 4 to the third angular position α3. This is shown in FIGS. 4.5 and 5.5.

By the cam and groove pair 7,8 of the bayonet catch 6 cooperating under wedging action, axial play is eliminated from the bayonet catch 6, and an axial bias is applied between the cam and groove pair 7,8. The breakable coupling between tightening part 24 and bearing part 11 then ensures that during tightening a predetermined maximum tightening moment on the bayonet catch 6 is not exceeded.

Figure 2:
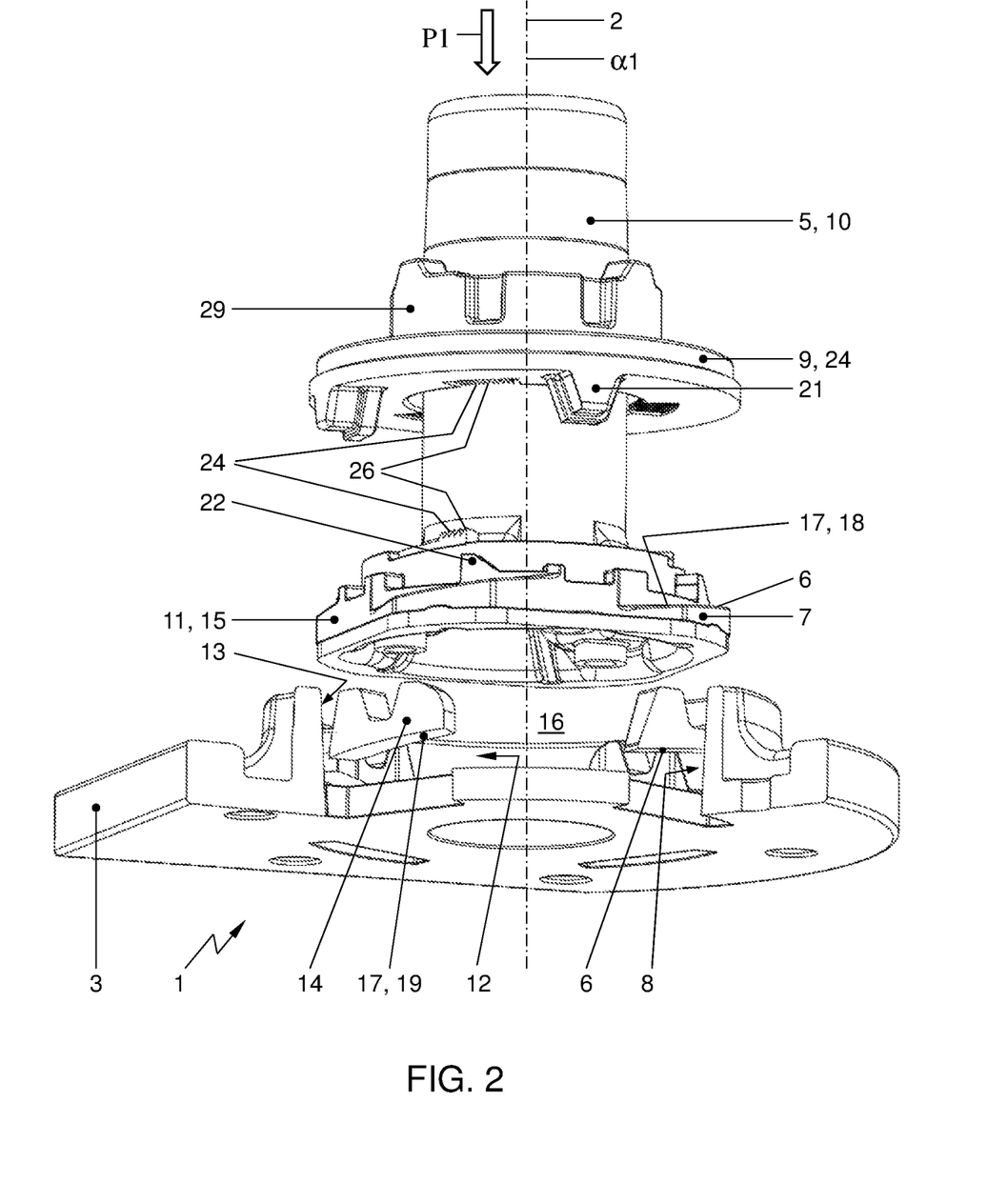
FIG. 2 shows a schematic perspective view of a second embodiment of a fastening construction according to the invention.
Figure 3:
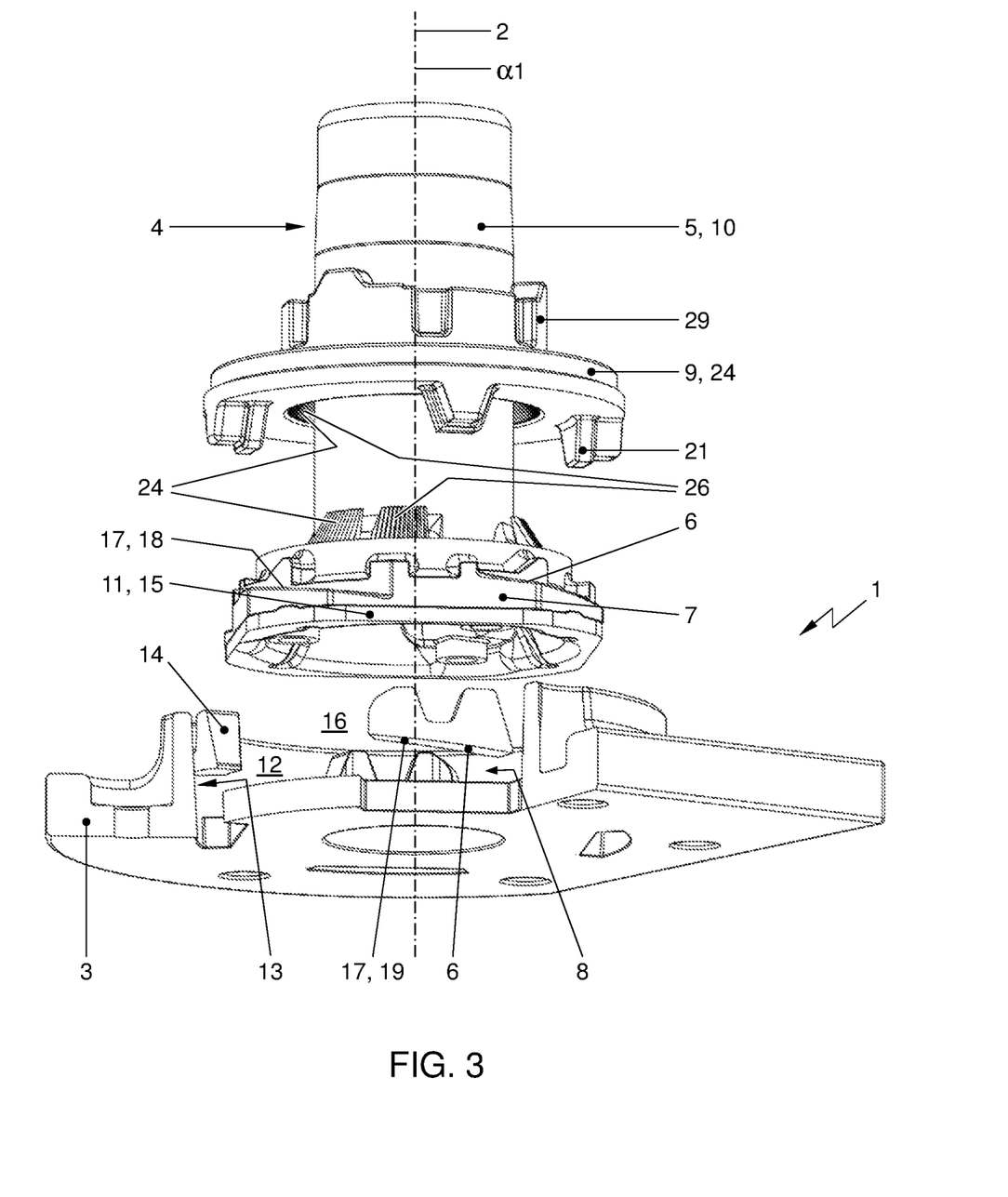
FIG. 3 shows a schematic perspective view of a third embodiment of a fastening construction according to the invention.
Figure 41:
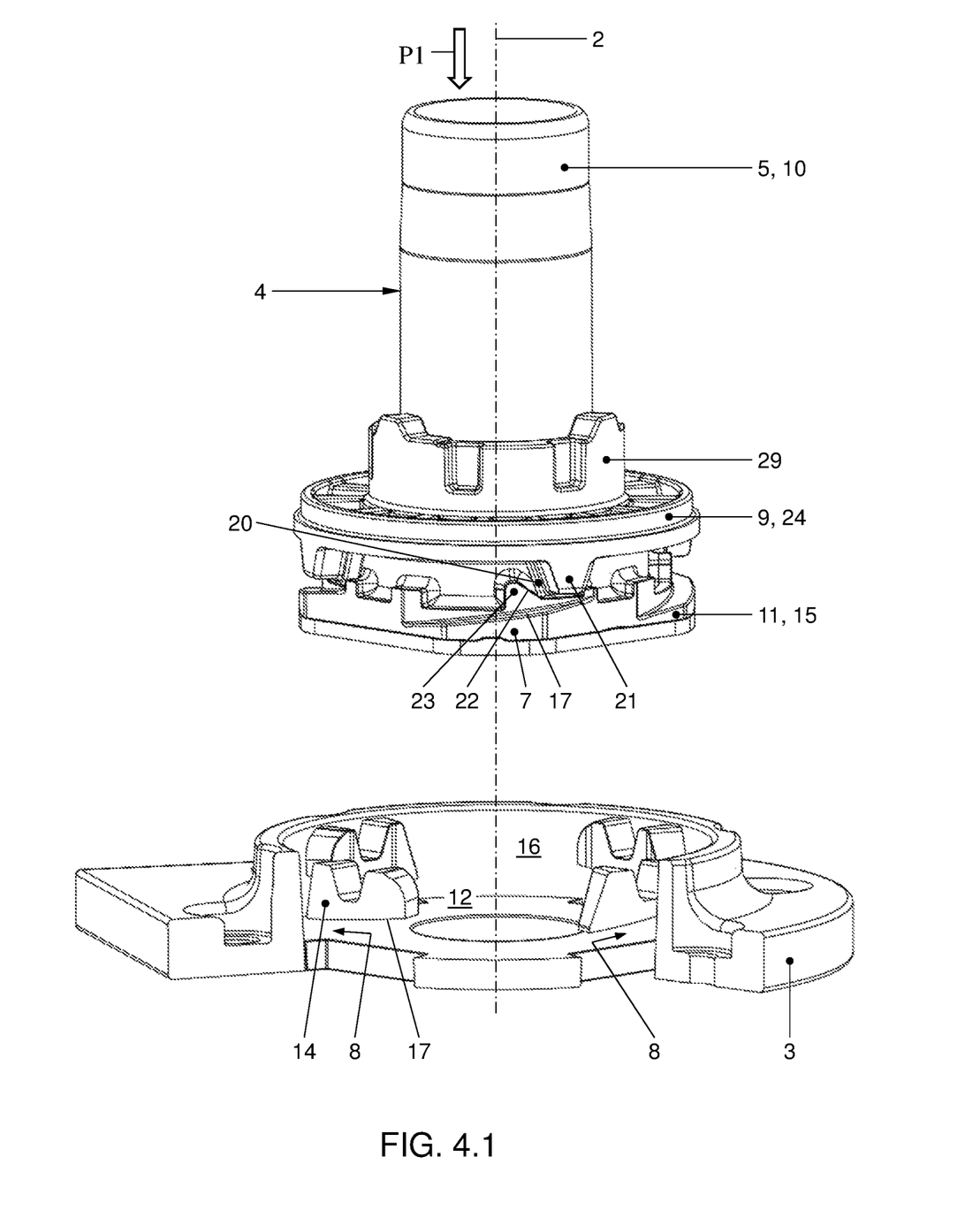

The rotation part 4 furthermore cooperates with the tightening part 24 via a fixation coupling 25. After uncoupling of the breakable coupling 20, and rotation of the tightening part 24 relative to the remaining portion of the rotation part 4, the tightening part 24, with the aid of this fixation coupling 25, can be coupled again with the remaining portion of the rotation part 4 to form a whole. The fixation coupling 25 comprises, as shown in FIG. 1, a toothing 26 extending radially between the tightening part 24 and the rotation part 4. In FIG. 2 an alternative embodiment is shown, in which the toothing 26 extends axially between the tightening part 24 and the rotation part 4. In FIG. 3 yet another embodiment is shown, in which the toothing 26 extends both radially and axially between the tightening part 24 and the rotation part 4. The fixation coupling 25 in the third angular position α3 couples the tightening part 24 nonrotatably with the rotation part 4. This coupling takes place when the tightening part 24 can move downward under the spring action. This downward movement in this exemplary embodiment can take place when the coupling cam 21 falls in a recess 28 in the base part 3. This is shown in FIGS. 4.6 and 5.6.

Figure 46:
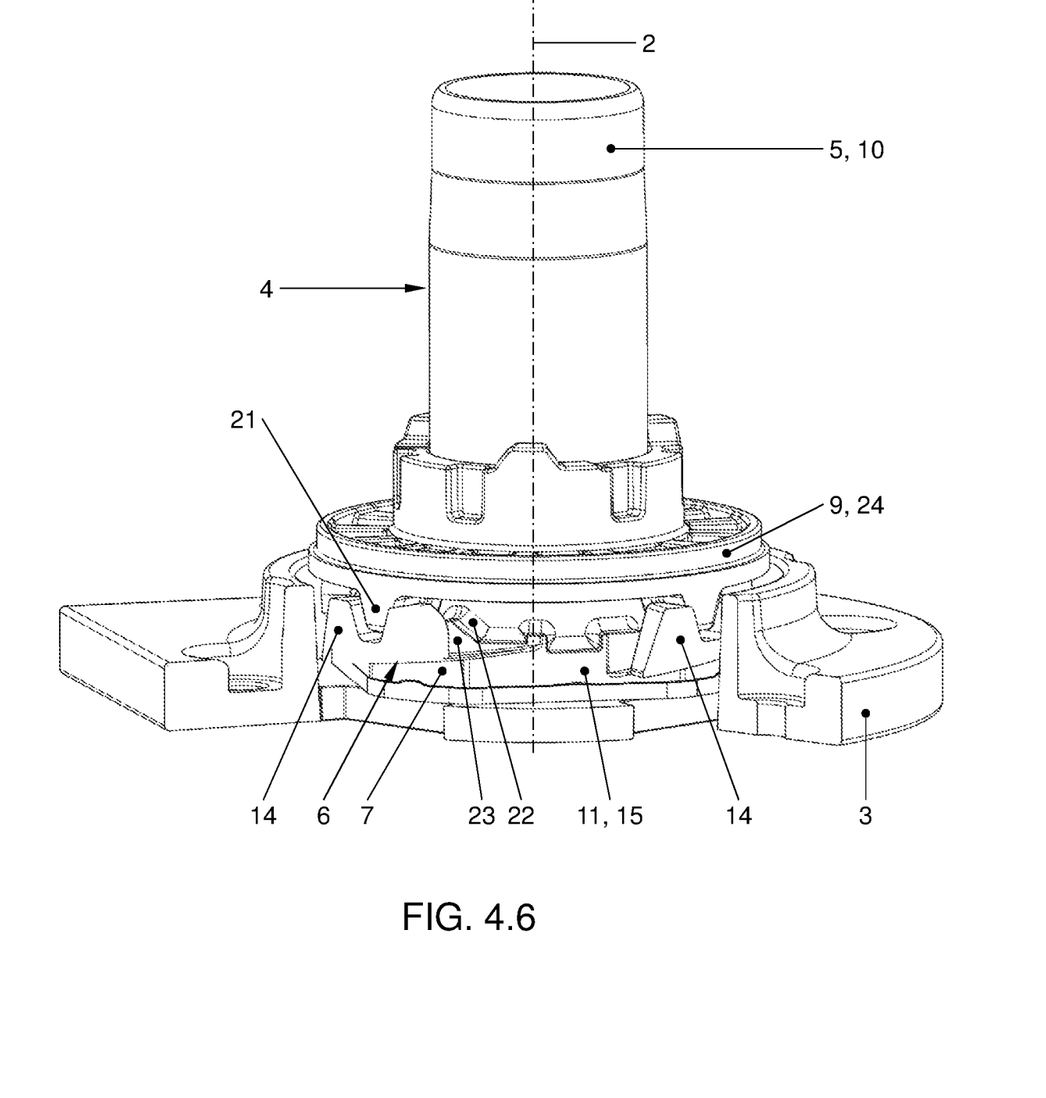
Figure 51:
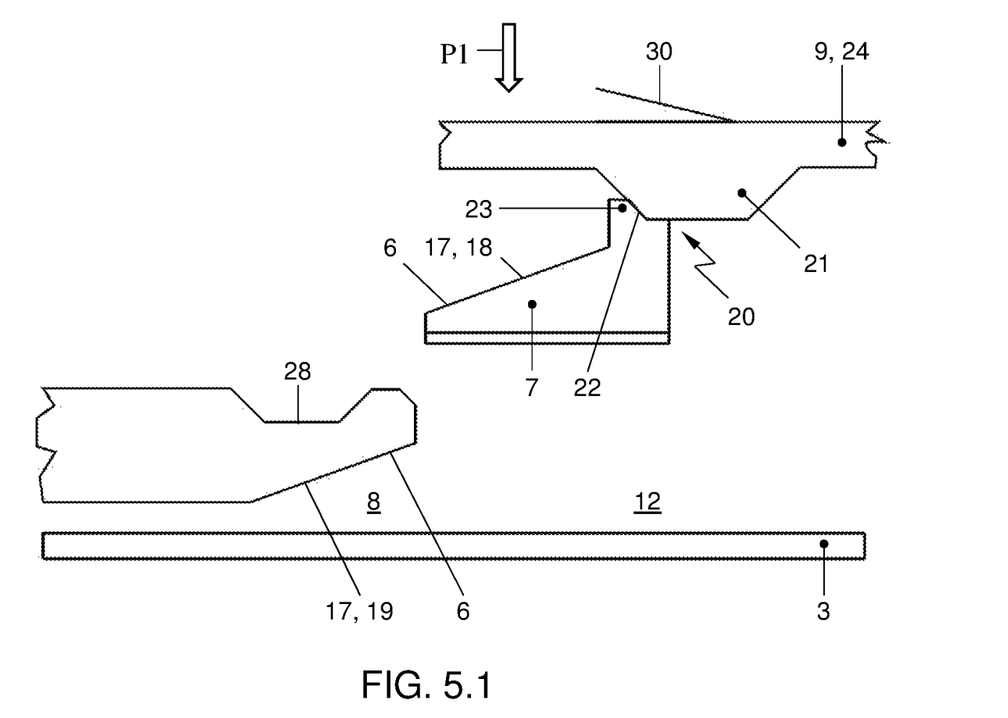
Figure 56:
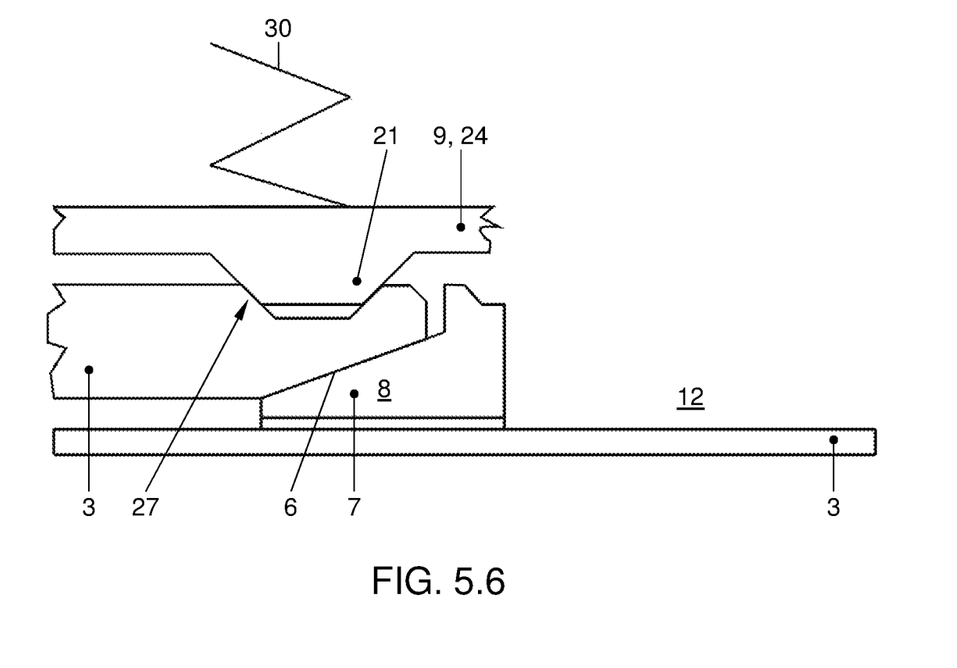

In the recess 28 in the base part 3, the coupling cam 21 is received in a rotation-locking manner in the third angular position α3. The recess 28 is part of cooperating blocking parts 27 which are provided between the rotation part 4 and the base part 3. The cooperating blocking parts 27 block the rotation part 4 in the third angular position α3 from rotation about the geometric axis 2 relative to the base part 3. This is shown in FIGS. 4.6 and 5.6. The recess 28 in the base part 3 in which the coupling cam 21 is received in the third angular position α3 in a rotation-locking manner, blockingly locks the rotation part 4 in the third angular position α3 against rotation about the geometric axis 2 relative to the base part 3. This allows a moment to be exerted on the rotation part 4 without the wedging action of the bayonet catch 6 being influenced, and this can prevent the bayonet catch 6 becoming overloaded, or detaching unintentionally.

Fastening the rotation part 4 to the base part 3 via a bayonet catch hence proceeds as follows. In a first assembly step shown in FIGS. 4.1 and 5.1 the rotation part 4 is moved along a geometric axis 2 in the direction of the arrow P1 to the base part 3 to align at least one cam and groove pair 7,8 of the bayonet catch as shown in FIGS. 4.2 and 5.2 for cooperation. In a second assembly step, the rotation part 4, by exertion of a tightening moment on an engaging member, is pivoted about the geometric axis 2 from a first angular position α1 in the direction of arrow P2 to a second angular position α2, shown in FIGS. 4.3 and 5.3, in which by wedging action of the at least one cam and groove pair 7,8, the rotation part 4 is locked with respect to the base part 3 axially play-free along the geometric axis 2. In a third assembly step, as a result of the wedging action between cam and groove pair 7,8, with the breakable coupling 20 shown in FIGS. 4.4 and 5.4 breaking, the tightening part 24 as shown in FIGS. 4.4 and 5.5 is rotated in the direction of arrow P3 from the second angular position α2 relative to the base part 3 and the remaining part of the rotation part 4 to the third angular position α3 shown in FIGS. 4.6 and 5.6. In the third angular position α3 the tightening part 24 is nonrotatably coupled with the rotation part 4 via the fixation coupling 25, and the tightening part 24 is blocked, via the cooperating blocking parts 27, from rotation about the geometric axis 2 relative to the base part 3.

The invention is not limited to the exemplary embodiments represented here. In particular, the fastening construction may be provided with a driving mechanism to adjust the housing electrically and the cam and groove pair of the bayonet catch may be implemented in a variety of ways. Also, with the fastening construction, an element other than a housing of a vision unit may be fastened, for example, a pivoting arm or a hub of a wheel, or a different object, for example a wall or frame.

Also, the fixation coupling may be designed in a manner other than with cooperating teeth. For instance, the fixation coupling may on one side comprise teeth that during use embed in the material of the other side, for example a rubbery material. Also, one side or both sides may be provided with pressure-sensitive glue for fixation of the coupling parts. Further, a one-way coupling may be provided, such as, for example, a ratchet mechanism, or a check spring.

These and other variations will be clear to one skilled in the art and are understood to be within the scope of the invention as represented in the following claims.

LIST OF REFERENCE SIGNS 1. fastening construction
2. geometric axis
3. base part
4. rotation part
5. central shaft
6. bayonet catch
7. cam
8. groove
9. flange
10. main shaft part
11. bearing part
12. chamber
13. wall
14. projection
15. bearing plate
16. access opening
17. surfaces cooperating under wedging action
18. wedge surface cam
19. wedge surface groove
20. breakable coupling
21. coupling cam
22. run-on surface
23. run-on cam
24. tightening part
25. fixation coupling
26. toothing
27. cooperating blocking parts
28. recess
29. ring with engaging elements
30. spring
P1 Arrow
P2 Arrow
P3 Arrow
$\alpha 1$ first angular position
$\alpha 2$ second angular position
$\alpha 3$ third angular position

The invention claimed is:

1. A fastening construction comprising:
    a base part configured to be connected with a vehicle; and
    a rotation part, couplable with the base part and which in a coupled condition forms a central shaft, wherein
    the base part and the rotation part are provided with at least one cam and groove pair cooperating as a bayonet catch, such that in a first angular position of the rotation part with respect to the base part, the rotation part for the purpose of coupling can be displaced along a geometric axis to the base part to align the cam and groove pair for cooperation,
    the rotation part is pivotable about the geometric axis from the first angular position to a second angular position in which through cooperation of the cam and groove pair, the rotation part is locked with respect to the base part axially along the geometric axis, characterized in that the cam and groove pair is provided with surfaces cooperating under wedging action, and
    the rotation part further cooperates with a tightening part in a manner rotation-coupled via a breakable coupling, so that the tightening part, with the breakable coupling breaking, can rotate relative to the base part and a remaining portion of the rotation part from the second angular position about the geometric axis to a third angular position.

2. The fastening construction according to claim 1, wherein the rotation part further cooperates with the tightening part via a fixation coupling, wherein the fixation coupling couples the tightening part in the third angular position nonrotatably with the rotation part.

3. The fastening construction according to claim 2, wherein the fixation coupling comprises a toothing extending at least one of radially or axially between the tightening part and the rotation part.

4. The fastening construction according to claim 1, wherein the rotation part and the base part are provided with cooperating blocking parts configured to block the rotation part in the third angular position against rotation about the geometric axis relative to the base part.

5. The fastening construction according to claim 4, wherein the cooperating blocking parts comprise a recess in the base part, in which a coupling cam in the third angular position is received in a rotation-locking manner.

6. The fastening construction according to claim 1, wherein the surfaces of the cam and groove pair comprise mutually facing, lying wedge surfaces configured to cooperate under wedging action.

7. The fastening construction according to claim 1, wherein the tightening part comprises a flange implemented as a separate component located around a main shaft part of the rotation part, wherein the main shaft part extends along the geometric axis.

8. The fastening construction according to claim 1, wherein the tightening part is movable relative to the rotation part axially along the geometric axis.

9. The fastening construction according to claim 1, wherein the rotation part further comprises a bearing part extending substantially radially with respect to the geometric axis, the bearing part configured to bear in a chamber of the base part, wherein the bearing part together with the chamber include the bayonet catch.

10. The fastening construction according to claim 1, wherein the tightening part during use is biased under spring action.

11. The fastening construction according to claim 10, wherein to generate the spring action, a spring is provided.

12. The fastening construction according to claim 11, wherein the spring is a helical spring arranged around the central shaft.

13. The fastening construction according to claim 10, wherein the spring action is towards a bearing part extending substantially radially with respect to the geometric axis, the bearing part including a cam or a groove of the cam and groove pair of the bayonet catch.

14. The fastening construction according to claim 1, wherein the breakable coupling comprises a coupling cam provided on the tightening part.

15. The fastening construction according to claim 14, wherein the coupling cam during use cooperates under spring action with a run-on surface provided on the base part.

16. The fastening construction according to claim 1, provided with a housing bearing-mounted around the rotation part.

17. An exterior vision unit for a motor vehicle, comprising the fastening construction according to claim 1.

18. A method for fastening a fastening construction to a motor vehicle comprising:
displacing a rotation part along a geometric axis to a base part to align at least one cam and groove pair of a bayonet catch for cooperation, and
pivoting of the rotation part about the geometric axis from a first angular position to a second angular position through exertion of a tightening moment on an engaging part in which by a wedging action of the at least one cam and groove pair, the rotation part is locked with respect to the base part axially such that the rotation part relative to the base part is free from play along the geometric axis; and
rotating of a tightening part from the second angular position relative to the base part and a remaining portion of the rotation part to a third angular position, as a result of the wedging action between the cam and groove pair, and breaking of a breakable coupling between the tightening part and the remaining portion of the rotating part, wherein
the rotation part is connected to the base part via the bayonet catch, the base part being fastened to the motor vehicle.

19. The method according to claim 18, wherein the tightening part in the third angular position is nonrotatably coupled with the rotation part via a fixation coupling.

20. The method according to claim 19, further comprising blocking of the rotation part in the third angular position via cooperating blocking parts against rotation about the geometric axis relative to the base part.

21. The method according to claim 18, wherein the fastening construction is part of an exterior vision unit for a motor vehicle.

* * * * *